(12) United States Patent
Bienfang et al.

(10) Patent No.: US 9,506,219 B2
(45) Date of Patent: Nov. 29, 2016

(54) SUPPORT RAIL AND SWING GEAR ASSEMBLY FOR A MINING VEHICLE

(71) Applicant: Caterpillar Global Mining LLC, Oak Creek, WI (US)

(72) Inventors: David T. Bienfang, Mukwonago, WI (US); Gurbachan S. Bumraw, Franklin, WI (US); Carl D. Gilmore, South Milwaukee, WI (US); Philip R. Strydom, Oak Creek, WI (US); Christopher R. Wanasek, Waterford, WI (US); Jeanne Yaunke, Delavan, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 125 days.

(21) Appl. No.: 14/325,973

(22) Filed: Jul. 8, 2014

(65) Prior Publication Data

US 2016/0010309 A1    Jan. 14, 2016

(51) Int. Cl.
*E02F 9/12* (2006.01)
*F16C 33/58* (2006.01)
(Continued)

(52) U.S. Cl.
CPC ................ *E02F 9/121* (2013.01); *B23P 15/14* (2013.01); *E02F 3/46* (2013.01); *E02F 9/12* (2013.01); *E02F 9/123* (2013.01); *F16C 33/581* (2013.01);
(Continued)

(58) Field of Classification Search
CPC ...... F16C 41/02; F16C 33/067; F16C 33/58; F16C 33/581; F16C 33/583; F16C 33/585; F16C 33/586; F16C 19/26; F16C 19/32; F16C 33/52; F16C 33/526; F16C 19/225; F16C 19/305; F16C 2300/14; F16C 2350/26; E02F 9/10; E02F 9/12; E02F 9/121; E02F 9/125; E02F 9/128; E02F 9/0006; E02F 9/022; B23Q 16/10; B23Q 16/102; B66C 23/84; B23P 15/14
USPC .......... 74/434, 813 L, 813 R, 439, 447, 446; 384/620; 212/247
See application file for complete search history.

(56) References Cited

U.S. PATENT DOCUMENTS 3,433,543 A * 3/1969 Eck .......................... F16C 19/30
                                                      384/621
3,888,357 A    6/1975 Bauer et al.
(Continued)

FOREIGN PATENT DOCUMENTS

JP      08150840        6/1996
KR   20090070563 A      7/2009
(Continued)

*Primary Examiner* — William Kelleher
*Assistant Examiner* — Joseph Brown
(74) *Attorney, Agent, or Firm* — Foley & Lardner

(57) ABSTRACT

A support rail for a swing gear assembly having a thrust rail coupled to a swing gear includes a substantially horizontal first surface configured to be coupled to the swing gear such that the first surface engages a substantially horizontal top face of the swing gear, and a substantially vertical second surface intersecting the substantially horizontal first surface such that the second surface is substantially perpendicular to the first surface. The second surface is configured to engage a substantially vertical face of the thrust rail when the first surface is coupled to the swing gear. The first surface and the second surface are configured to inhibit a rotation of the thrust rail relative to the swing gear by engaging the top face of the swing gear and the vertical face of the thrust rail simultaneously.

20 Claims, 6 Drawing Sheets

(51) Int. Cl.
*B23P 15/14* (2006.01)
*F16C 41/02* (2006.01)
*E02F 3/46* (2006.01)
*B66C 23/84* (2006.01)

(52) U.S. Cl.
CPC ............... *F16C 41/02* (2013.01); *B66C 23/84* (2013.01); *F16C 2300/14* (2013.01)

(56) References Cited

U.S. PATENT DOCUMENTS

| | | | |
|---|---|---|---|
| 3,972,378 A | 8/1976 | Houriez et al. | |
| 4,524,875 A | 6/1985 | Jamieson | |
| 4,582,436 A * | 4/1986 | Merron | E02F 9/121 384/593 |
| 4,622,860 A * | 11/1986 | Cametti | E02F 9/121 212/175 |
| 4,723,852 A * | 2/1988 | Ehret | E02F 9/006 29/898.07 |
| 5,205,657 A * | 4/1993 | Feld | B66C 23/84 384/618 |
| 5,333,510 A * | 8/1994 | Anderson | G01L 5/0009 73/862.381 |
| 5,440,970 A | 8/1995 | Tonsor | |
| 5,676,471 A * | 10/1997 | Kallenberger | B66C 23/84 384/593 |
| 6,266,901 B1 | 7/2001 | Kanda et al. | |
| 6,752,282 B2 * | 6/2004 | Brown, Jr. | E02F 9/121 212/247 |
| 8,251,020 B2 | 8/2012 | Mattews | |
| 8,573,852 B2 * | 11/2013 | Knuth | E02F 9/123 384/593 |
| 2006/0120652 A1 * | 6/2006 | Docimo | F16C 19/26 384/572 |
| 2006/0239601 A1 * | 10/2006 | Otaka | F16C 33/526 384/574 |
| 2011/0255815 A1 * | 10/2011 | Frank | F16C 19/163 384/462 |
| 2012/0121215 A1 * | 5/2012 | Knuth | B66C 3/02 384/619 |
| 2013/0287331 A1 | 10/2013 | Sekido | |
| 2015/0023624 A1 * | 1/2015 | Bouron | F16C 33/583 384/559 |

FOREIGN PATENT DOCUMENTS

WO WO 2013/081610 A1 6/2013
WO WO 2013081610 A1 * 6/2013 ............. F16C 19/30

* cited by examiner

SUPPORT RAIL AND SWING GEAR ASSEMBLY FOR A MINING VEHICLE

TECHNICAL FIELD

This disclosure relates to mining vehicles having an upper frame that is rotatable relative to a lower frame, and particularly to swing assemblies for facilitating rotation of the upper frame.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mining shovels and other large industrial vehicles may have an upper frame configured to rotate relative to a lower frame via a swing gear assembly, such as to move a coupled work implement (e.g., a dipper shovel) to a particular location. Often, the swing gear assembly includes a swing gear (e.g., a swing rack) coupled to the lower frame, a series of rollers configured to facilitate rotation of the upper frame relative to the lower frame, and a thrust rail (i.e., a support rail) coupled to the swing gear. The thrust rail may be configured to interface with both the swing gear and the rollers, as well as to retain the rollers in a desired position. The swing gear may also include a machined inner surface intended to retain the thrust rail and the rollers.

During operation of the mining shovel (e.g., as the upper frame is rotated), the rollers may be subject to a pressure load due to the impact or weight of the upper frame, such that the rollers are pushed radially outward from the swing gear assembly. Due to the load, the rollers and the thrust rail may be biased in a radially outward direction, and the fasteners coupling the components of the swing gear assembly may be stretched or broken. Further, the thrust rail often extends above the inner surface of the swing gear, resulting in a bending moment on a top portion of the inner surface of the swing gear. The outward radial force of the rollers may thus cause wear to the rollers, the thrust rail, and/or the inner surface of the swing gear, which may reduce the efficiency or effectiveness of the mining shovel and may require replacement of a portion of the swing gear assembly.

Swing gear assemblies may include devices configured to impede the radial thrust of an associated roller circle. An example of such a device can be found in U.S. Patent Publication No. 2013/0287331, published Oct. 31, 2013, for "Thrust Roller Bearing," which discloses a thrust cage for retaining a plurality of rollers. The thrust cage includes a plurality of separate cage bodies configured to retain the individual rollers in a roller accommodating space. However, the cage bodies do not include both a horizontal and a vertical surface configured to provide support, and the cage bodies may not inhibit a rotational movement of the rollers relative to an adjacent component.

SUMMARY

An embodiment of the present disclosure relates to a support rail for a swing gear assembly having a thrust rail coupled to a swing gear. The support rail includes a substantially horizontal first surface configured to be coupled to the swing gear such that the first surface engages a substantially horizontal top face of the swing gear, and a substantially vertical second surface intersecting the substantially horizontal first surface such that the second surface is substantially perpendicular to the first surface. The second surface is configured to engage a substantially vertical face of the thrust rail when the first surface is coupled to the swing gear. The first surface and the second surface are configured to inhibit a rotation of the thrust rail relative to the swing gear by engaging the top face of the swing gear and the vertical face of the thrust rail simultaneously.

Another embodiment of the present disclosure relates to a swing gear assembly. The swing gear assembly includes a swing gear having a substantially horizontal top face and a substantially vertical inner surface, a thrust rail having a substantially vertical face, wherein the thrust rail is coupled to the swing gear such that the vertical face of the thrust rail engages a portion of the vertical inner surface of the swing gear, and a support rail coupled to the swing gear. The support rail includes a substantially horizontal first surface engaging the top face of the swing gear, and a substantially vertical second surface engaging a top portion of the vertical face and intersecting the substantially horizontal first surface such that the second surface is substantially perpendicular to the first surface. The first surface and the second surface are configured to inhibit a rotation of the thrust rail relative to the swing gear by engaging the top face of the swing gear and the vertical face of the thrust rail simultaneously.

Another embodiment of the present disclosure relates to a method of enhancing support for a swing gear assembly. The method includes boring a plurality of slots in a substantially horizontal top face of a swing gear, and placing a support rail proximate to a thrust rail and the plurality of slots, wherein the thrust rail includes a substantially vertical face. The method also includes, using the plurality of slots, coupling the support rail to the swing gear such that a substantially horizontal first surface of the support rail engages the top face of the swing gear and a substantially vertical second surface of the swing gear engages the vertical face of the thrust rail, and wherein the first surface and the second surface are configured to inhibit a rotation of the thrust rail relative to the swing gear by engaging the top face and the vertical face simultaneously.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
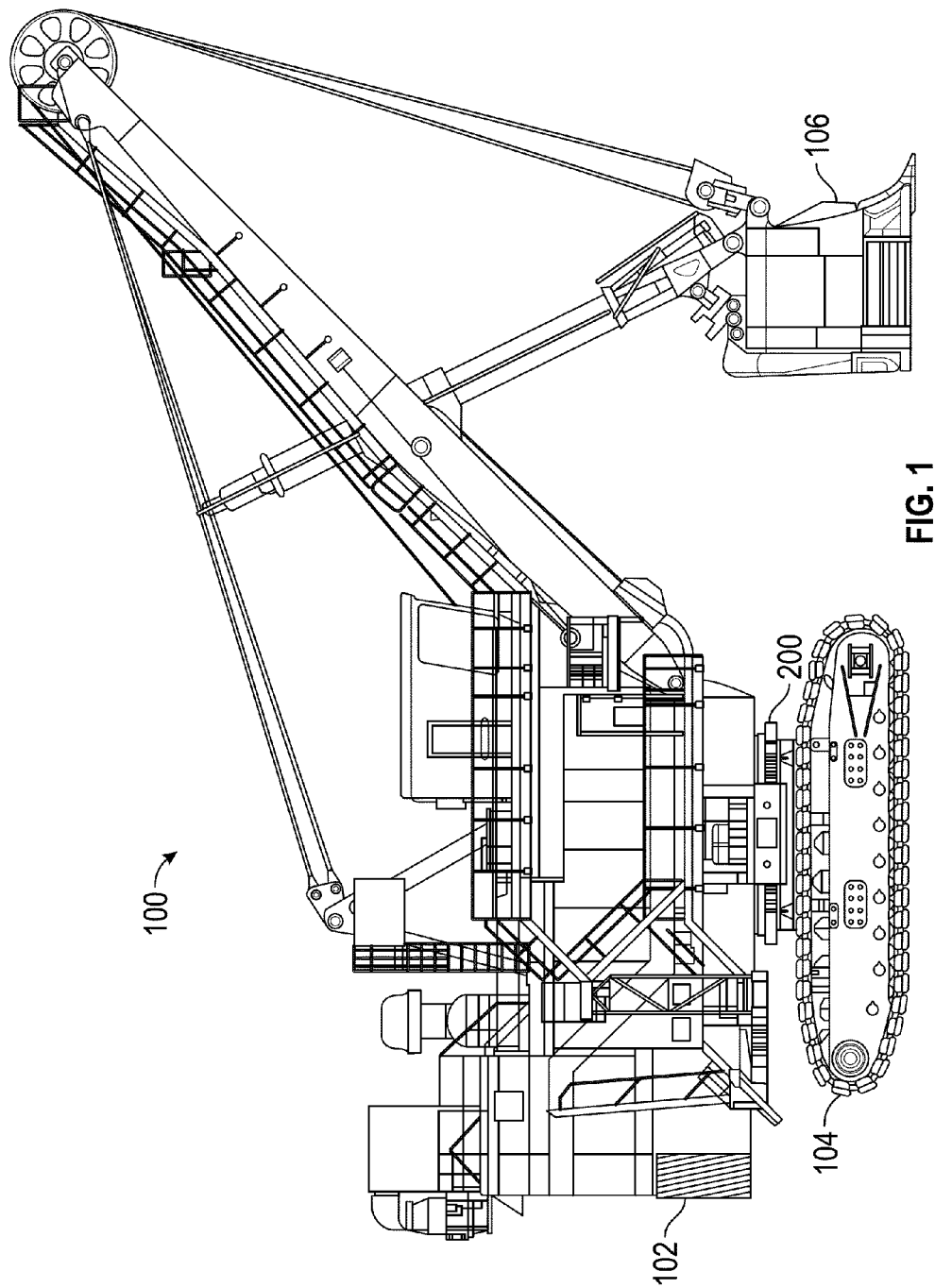
FIG. 1 is a side view of a mining vehicle having a swing gear assembly, according to an exemplary embodiment.

Referring to FIG. 1, a rope shovel 100 is shown, according to an exemplary embodiment. The rope shovel 100 includes an upper frame 102 and a lower frame 104. The upper frame 102 is rotatably coupled to the lower frame 104 by a swing gear assembly 200 (e.g., swing assembly, swing plate assembly, etc.), such that the upper frame 102 is configured to rotate relative to the lower frame 104. The rope shovel 100 may also include a dipper assembly 106 or another similar work implement. The dipper assembly 106 may be rotated with the upper frame 102 in relation to the lower frame 104. As an example, the upper frame 102 may be rotated relative to the lower frame 104 in order to move the dipper assembly 106 to a particular location within a work site, such as to scoop or transport dirt or other mining material. Although the disclosure is shown and described by way of example with reference to an electric rope shovel 100, the disclosure is also applicable for use with any equipment having an upper frame that rotates relative to a lower frame via a swing gear assembly, such as mining shovels, draglines, excavators, etc., all of which are intended to be within the scope of this disclosure.

Figure 2:
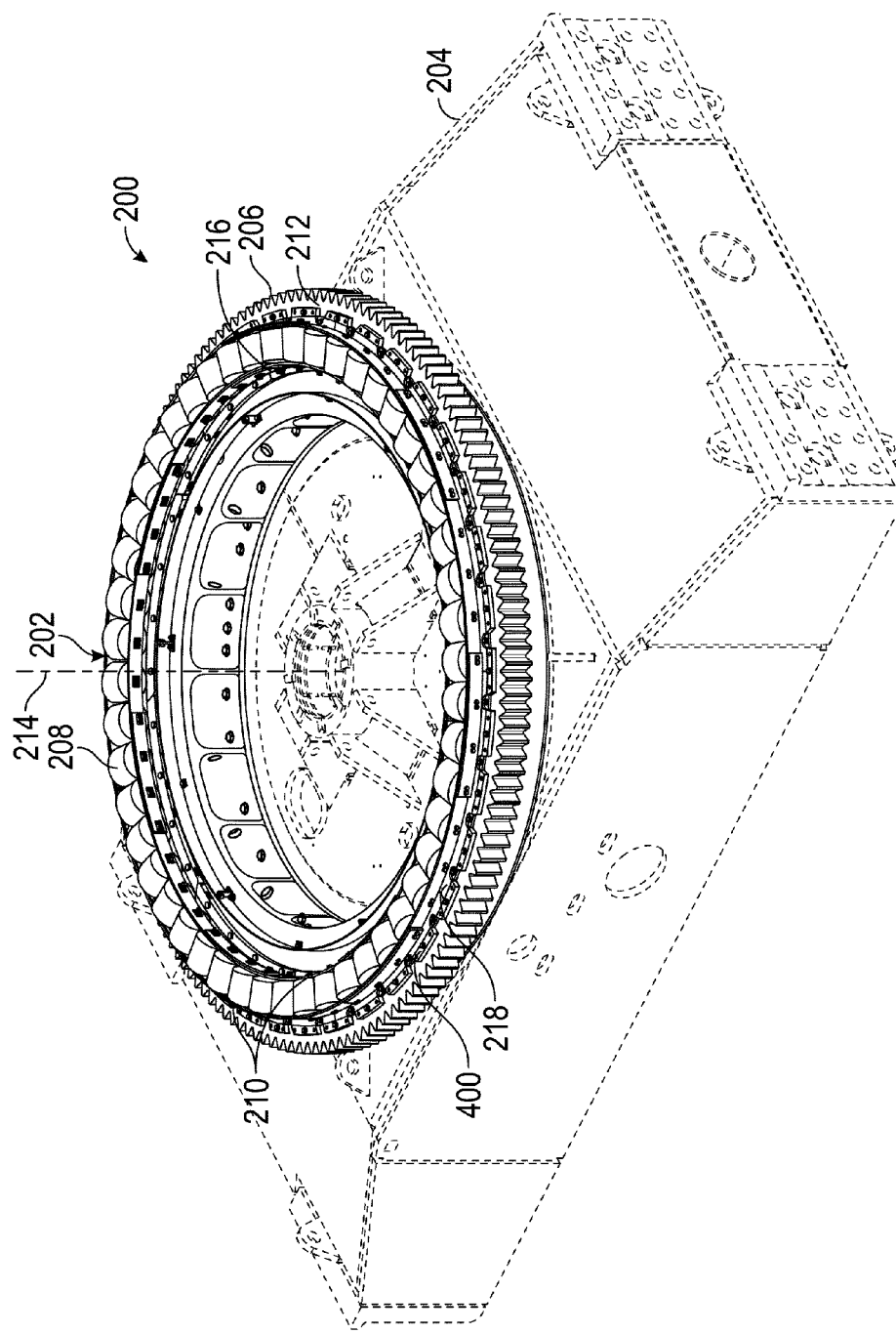
FIG. 2 is a perspective view of a swing gear assembly having a support rail, according to an exemplary embodiment.
Figure 3:
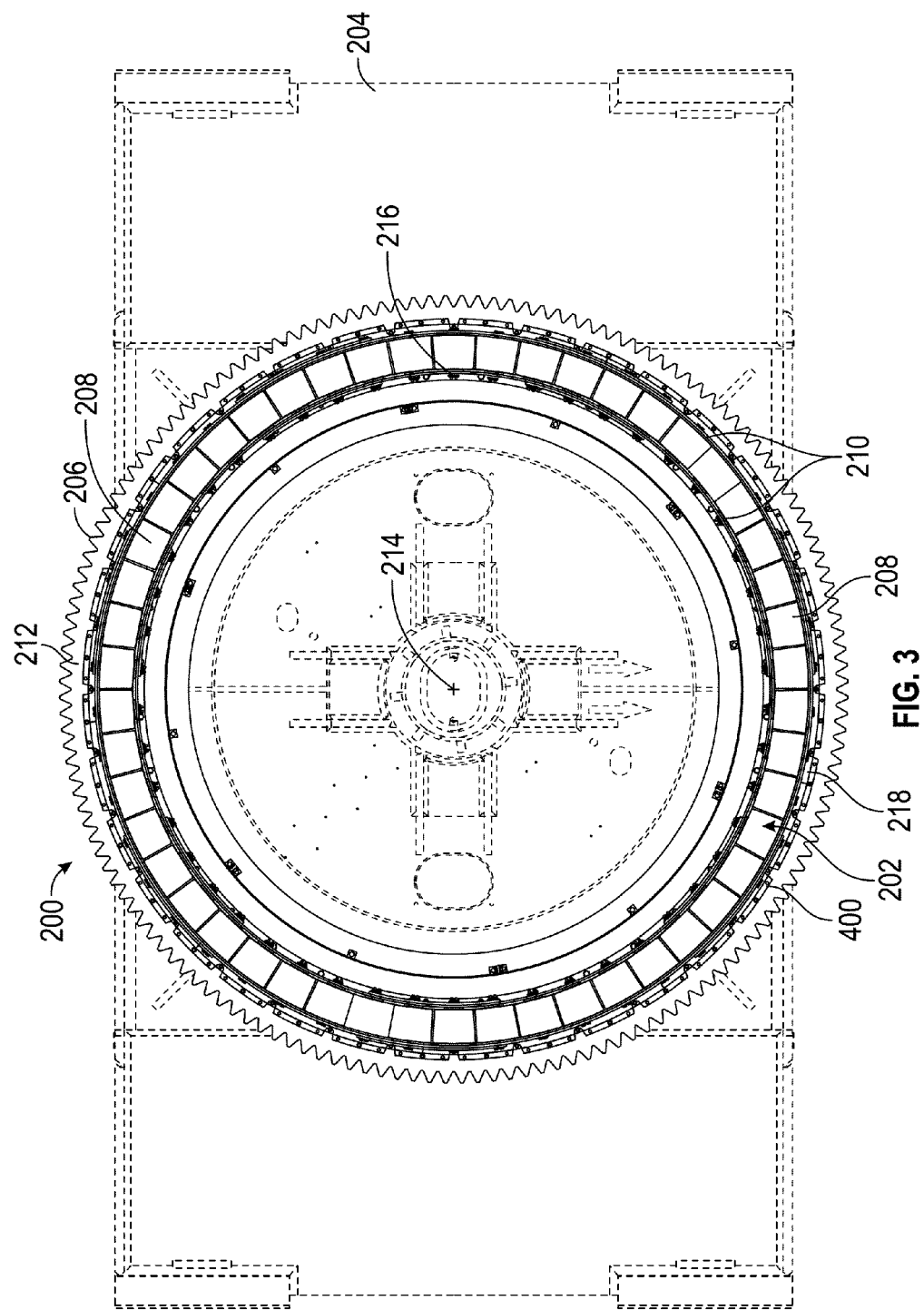
FIG. 3 is a top view of the swing gear assembly of FIG. 2.

Referring now to FIGS. 2 and 3, the swing gear assembly 200 is shown with more particularity, according to an exemplary embodiment. The swing gear assembly 200 includes a swing gear 206 (e.g., a swing rack). In this embodiment, the swing gear 206 has an approximately circular shape to provide a 360 degree rotation for the upper frame 102 about a central axis 214. The swing gear assembly 200 may include a frame 204 for coupling the swing gear 206 to the lower frame 104, or the swing gear 206 may be configured to otherwise couple to the lower frame 104. The swing gear 206 includes a top face 212 (e.g., surface) extending around an outer edge of the swing gear 206, and a lower rail 216 (e.g., rail, plate, etc.) positioned inside of the top face 212.

The swing gear assembly 200 also includes thrust rails 218 coupled to the swing gear 206 (e.g., the top face 212, the lower rail 216) and configured to contact at least one surface of the swing gear 206. In the illustrated embodiment of FIGS. 2 and 3, the swing gear assembly 200 includes a plurality of thrust rails 218 (e.g., eight thrust rails 218) that are substantially identical and shaped to match a curvature of the swing gear 206. The thrust rails 218 may be coupled to the lower rail 216 of the swing gear 206, extending end to end along the entirety of an inner circumference of the swing gear 206. In this embodiment, the thrust rails 218 form a substantially circular shape to match the shape of the swing gear 206. For instance, the thrust rails 218 may form a substantially circular shape having an outer circumference proportionate to or corresponding with a circumference of the swing gear 206. In other embodiments, the swing gear assembly 200 may include a single thrust rail having a circular shape and being configured to extend along the an entire inner circumference of the swing gear 206 (i.e., such that a single component is sized and shaped according to the plurality of thrust rails 218 shown in FIG. 2).

A roller circle 202 rests atop the swing gear 206 (e.g., such that the roller circle 202 engages the lower rail 216). The roller circle 202 includes a series of rollers 208. The rollers 208 may be configured to receive or otherwise interface with the upper frame 102. The roller circle 202 (e.g., the rollers 208) may act as a bearing between the swing gear 206 and the upper frame 102, facilitating rotation of the upper frame 102 about the axis 214 (and along the rollers 208) with respect to the lower frame 104. The rollers 208 may be configured to roll independently of the thrust rail 218 and the swing gear 206, such as in a direction opposite or perpendicular to a rotation of the swing gear 206. The rollers 208 may be arranged to match a dimension of the swing gear 206, such as being arranged to match or correspond with a circumference of the swing gear 206. The roller circle 202 may have a substantially circular shape in order to facilitate a 360 degree rotation of the upper frame 102 about the central axis 214. The roller circle 202, including the rollers 208, may also be sized and/or shaped according to one or more dimensions of the upper frame 102.

The roller circle 202 may also include one or more brackets 210 for housing and/or coupling together the set of rollers 208. The brackets 210 may be configured to provide a path for guiding and/or maintaining the rollers 208 within a particular arrangement, such as to maintain alignment of the rollers 208 relative to the upper frame 102. The brackets 210 may also at least partially retain the rollers 208, such as in response to a radially outward movement of the rollers 208. The brackets 210 may be shaped according to a desired arrangement of the rollers 208 and/or a shape of the swing gear 206. In an exemplary embodiment, the brackets 210 are arranged in a substantially circular shape in order to match the shape of the swing gear 206 and the desired arrangement of the rollers 208, as well as to facilitate a 360 degree rotation of the upper frame 102 relative to the lower frame 104. The swing gear 206, the support rail assembly, and the roller circle 202 may share one or more dimensions in order to fit together according to the illustrated embodiment. For instance, an outer circumference formed by the rollers 208, an inner circumference of the support rail assembly, and a circumference of the brackets 210 may be approximately equal to each other.

The thrust rails 218 may be configured to at least partially inhibit a radially outward movement of the rollers 208. For instance, when the upper frame 102 rests on the rollers 208, the rollers 208 and/or other components of the roller circle 202 may receive a force, or "impact load," due to the weight of the upper frame 102. The impact load applied by the upper frame 102 may cause the rollers 208 to push out (i.e., move radially outward) from the central axis 214, applying a "thrust load" to the thrust rails 218. The thrust rails 218 are intended to at least partially counteract the thrust load from the rollers 208 in order to at least partially inhibit radially outward movement of the rollers 208 and/or the roller circle 202 relative to the central axis 214.

Still referring to FIGS. 2 and 3, the swing gear assembly 200 also includes support rails 400. The support rails 400 are coupled to the top face 212 of the swing gear 206. The support rails 400 (i.e., a support rail assembly) are configured to interface with both the swing gear 206 and the thrust rails 218 in order to retain a relative position of the rollers 208 and/or the thrust rails 218. For instance, when a thrust load is applied to the thrust rails 218 (e.g., via the rollers 208), the support rails 400 are configured to receive and counteract the thrust load from the thrust rails 218, and to at least partially inhibit radially outward movement of the rollers 208 and the thrust rails 218. The thrust load may be transferred from the rollers 208, to the thrust rails 218, and then to the support rails 400. The support rails 400 may then apply the thrust load to the swing gear 206 in a radially outward direction (e.g., away from the central axis 214). In an exemplary embodiment, the support rails 400 are configured to inhibit a radially outward movement of the rollers 208 and the thrust rails 218, inhibit a rotation of the support rails 400 into or relative to the swing gear 206, and also inhibit or prevent a bending moment applied to the swing gear 206 due to the support rails 400.

Figure 4:
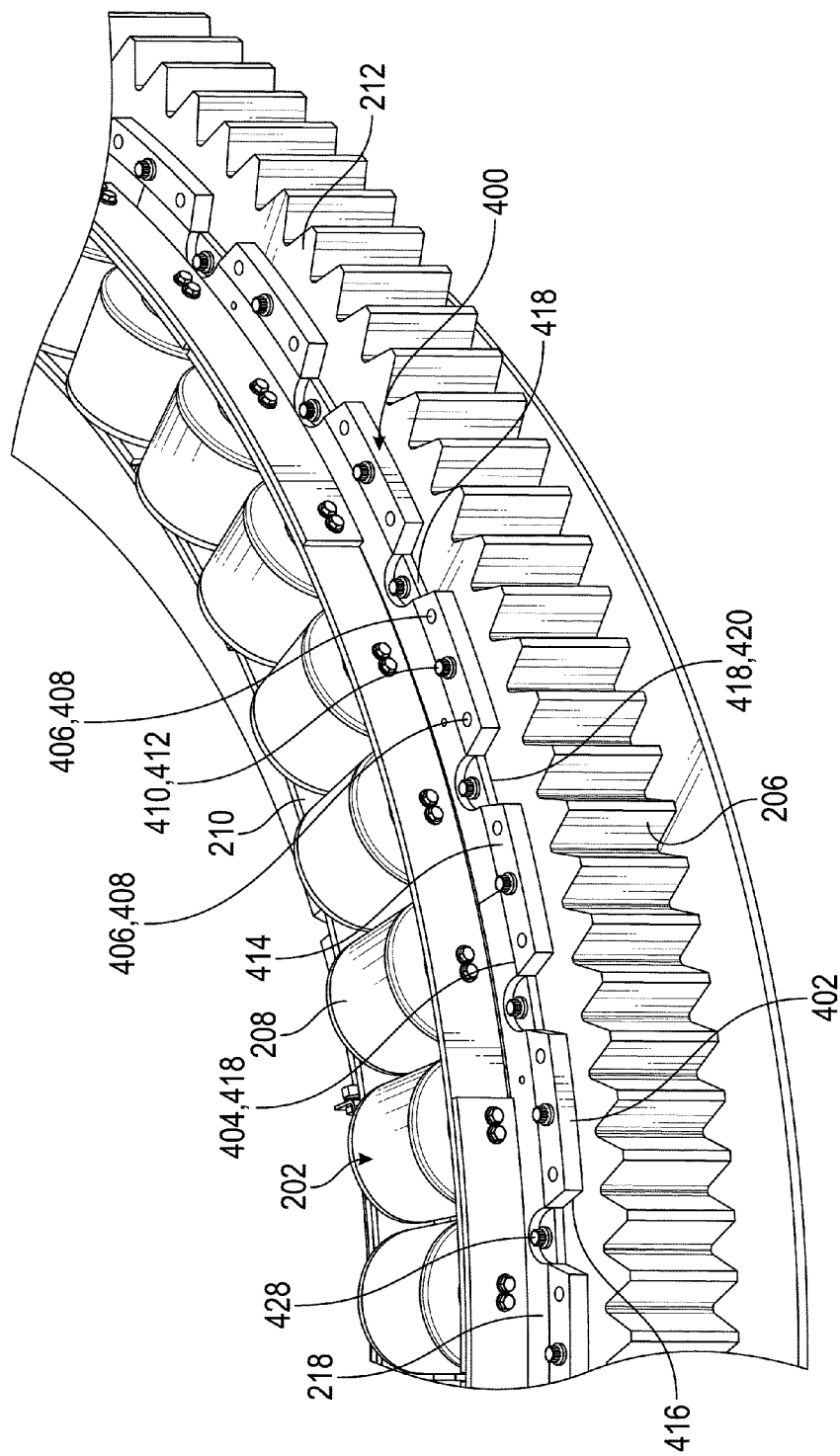
FIG. 4 is a perspective view of a swing gear assembly having a support rail, according to an exemplary embodiment.
Figure 5:
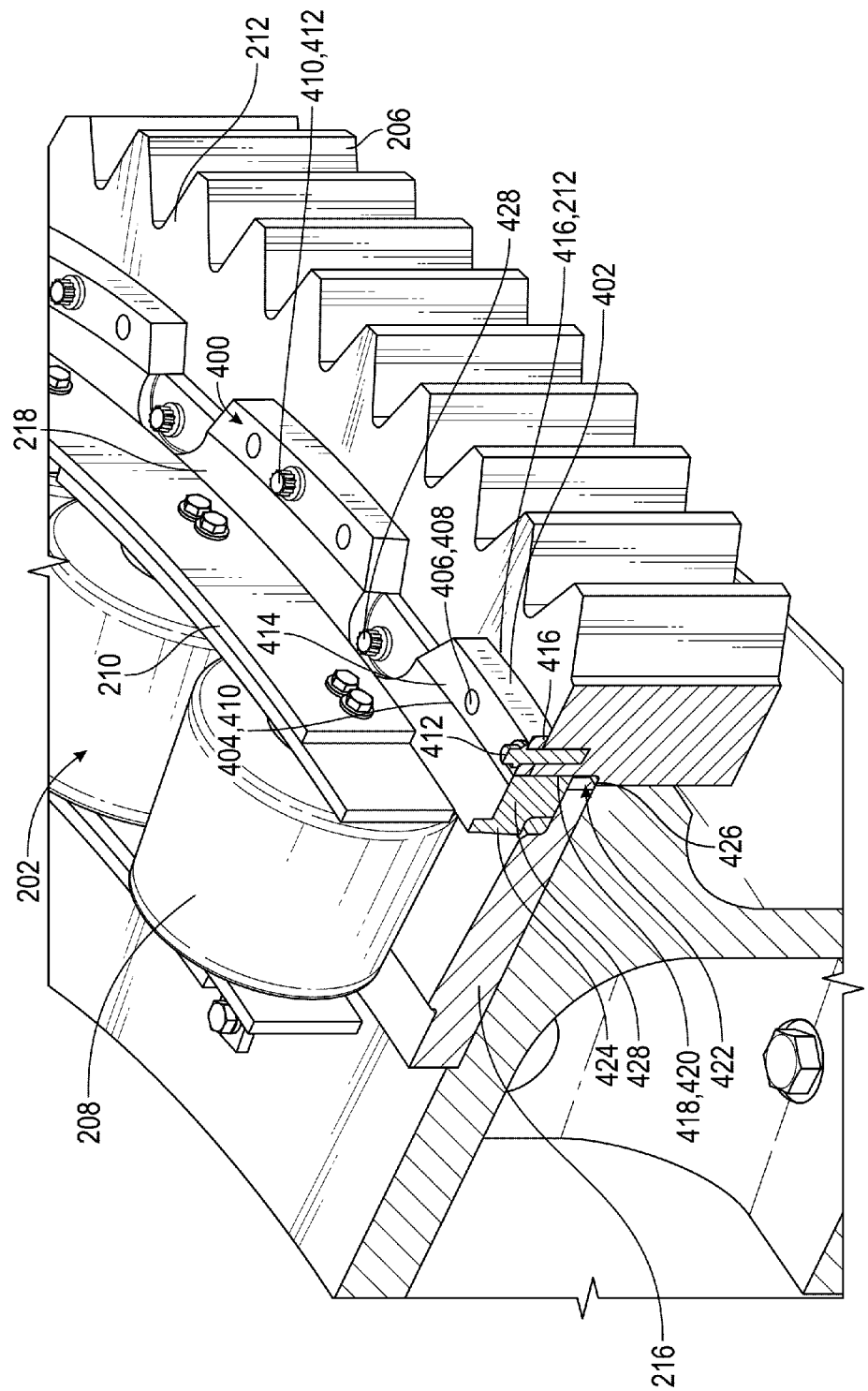
FIG. 5 is a perspective and cross-sectional view of the swing gear assembly, according to an exemplary embodiment.
Figure 6:
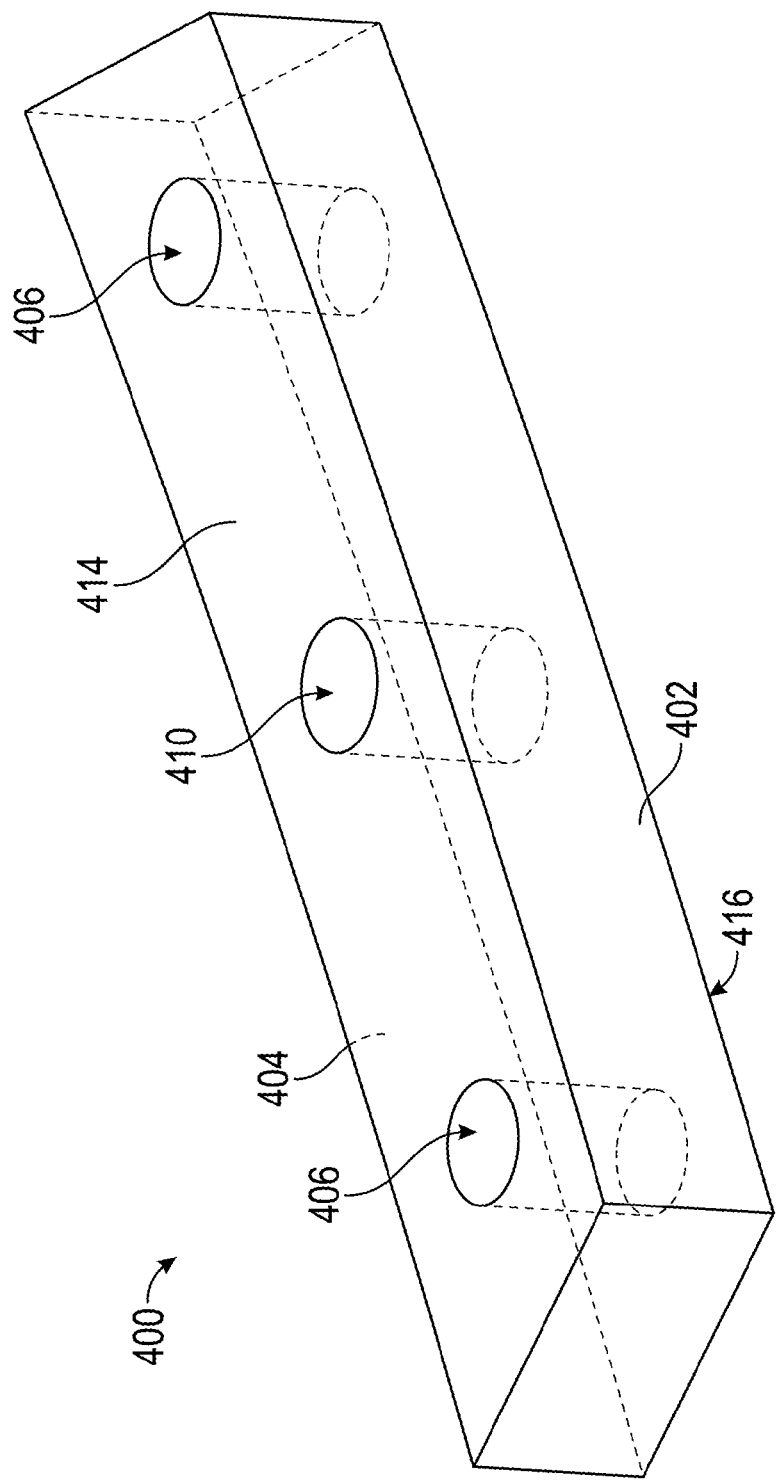
FIG. 6 is an isolated perspective view of the support rail, according to an exemplary embodiment.

Referring now to FIGS. 4 through 6, the support rail 400 is shown with more particularity, according to an exemplary embodiment. FIG. 4 shows the support rail 400 coupled to the swing gear 206 as part of the swing gear assembly 200. FIG. 5 shows a cross-sectional view of the swing gear assembly 200, including the interaction between the support rail 400 and the swing gear 206. FIG. 6 shows an isolated view of the support rail 400. As shown in FIGS. 4 through 6, the support rail 400 may be curved to approximate a curvature or shape of the swing gear 206, the thrust rail 218, and/or the roller circle 202. The support rail 400 includes a substantially vertical outer surface 402 positioned opposite a substantially vertical inner surface 404. The support rail 400 also includes a substantially horizontal top surface 414 positioned opposite a substantially horizontal bottom surface 416. In an exemplary embodiment, the surfaces 402 and 404 are substantially parallel to each other, the surfaces 414 and 416 are substantially parallel to each other, and the surfaces 402 and 404 are substantially perpendicular to the surfaces 414 and 416. In various embodiments, any of the surfaces 402, 404, 414, and 416 may be curved or otherwise sized or shaped according to one or more dimensions of the swing gear 206, the thrust rail 218, the roller circle 202, or another related component.

When the support rail 400 is coupled to the swing gear 206 (as shown in FIGS. 4 and 5), the support rail 400 covers at least a portion of the horizontal top face 212 of the swing gear 206, such that the bottom surface 416 interfaces with at least a portion of the top face 212. Similarly, the support rail 400 is positioned adjacent and outside of the thrust rail 218 (relative to the central axis 214), such that the inner surface 404 interfaces with at least a portion of a vertical surface 418 of the thrust rail 218. In an exemplary embodiment, the bottom surface 416 engages (e.g., interfaces with or otherwise contacts) the top face 212 and the inner surface 404 engages the vertical surface 418 simultaneously when the support rail 400 is coupled to the swing gear 206. In some embodiments, the surface 404 may be curved to match a curvature of the thrust rail 218 and/or be shaped to match one or more dimensions of the thrust rail 218. For instance, the surface 404 may be configured to contact the thrust rail 218 substantially evenly around an outer circumference formed by the thrust rails 218. In the illustrated embodiment, the bottom surface 416 is substantially flat, such as to engage a substantially flat top face 212. In other embodiments, the bottom surface 416 may include one or more features (e.g., ridges, contours, apertures, etc.) configured to match one or more features or dimensions of the top face 212.

By being coupled to the swing gear 206 and engaging the vertical surface 418 of the thrust rail 218 and the horizontal top face 212 of the swing gear 206 simultaneously, the support rail 400 is intended to inhibit an outward radial movement of the rollers 208 and/or the thrust rail 218. When the support rail 400 is coupled to the swing gear 206 (as shown in FIGS. 4 and 5), the vertical inner surface 404 of the support rail 400 may be configured to receive a thrust load from the thrust rail 218. For instance, when the rollers 208 are forced radially outward due to at least the weight of the upper frame 102, the thrust load applied by the rollers 208 may be transferred through the adjacent thrust rail 218 to the support rail 400 via the inner surface 404. The inner surface 404 of the support rail 400 may thus be configured to inhibit outward radial movement of the rollers 208 and the thrust rail 218 when the support rail is coupled to the swing gear 206. In an exemplary embodiment, the support rail 400 receives the thrust load from the rollers 208 and transfers the thrust load to the swing gear 206.

The support rail 400 may also inhibit rotational movement of the thrust rail 218 relative to the swing gear 206 in response to the thrust load, which may reduce or prevent a bending moment applied to the swing gear 206 by the thrust rail 218. In particular, the support rail 400 may substantially prevent the vertical surface 418 from being driven into the top face 212 of the swing gear 206 in response to the thrust load from the rollers 208 by engaging a horizontal surface of the swing gear 206 (e.g., top face 212) and an adjacent vertical surface of the thrust rail 218 (e.g., vertical surface 418) simultaneously. As shown in FIG. 5, the thrust rail 218 does not engage a horizontal surface of the swing gear 206 (e.g., top face 212). Rather, the vertical surface 418 of the thrust rail 218 engages a vertical inner surface 420 of the swing gear 206. The vertical surface 418 extends above the horizontal top face 212 of the swing gear 206. Thus, when the support rail 400 is not coupled to the swing gear 206, the thrust load from the rollers 208 may cause a top portion of the vertical surface 418 to be rotated about the top face 212, driving the vertical surface 418 into the top face 212 and creating a bending moment on the swing gear 206. In effect, the support rail 400 may act as a horizontal engagement surface for the thrust rail 218 on the swing gear 206 by interfacing with the thrust rail 218 on the vertical surface 418 and engaging the swing gear 206 on the horizontal surface 212. The support rail 400 provides the vertical inner surface 404 for engaging the top portion of the vertical surface 418, which may inhibit or prevent the vertical surface 418 from rotating about the top face 212, thus inhibiting or reducing the bending moment at the swing gear 206. For instance, in the illustrated embodiment of FIGS. 5 and 6, the vertical surface 418 and the horizontal bottom surface 416 intersect at an approximate right angle such that the thrust rail 218 and the support rail 400 together engage a horizontal and vertical surface of the swing gear 206 simultaneously.

In an exemplary embodiment, the support rail 400 is coupled to the swing gear 206 using fasteners 412. The support rail 400 includes slots 410 (i.e., a first plurality of slots) formed through the support rail 400 for receiving the fasteners 412. The swing gear 206 also includes slots (i.e., a second plurality of slots) formed in the top face 212 and sized to match a dimension of the slots 410 and/or the fasteners 412. The slots formed in the top face 212 of the swing gear 206 may be configured to align with the slots 410 in order to receive the fasteners 412 when the swing gear 206 and the support rail 400 are in the configuration shown in FIG. 5. In some embodiments, the slots 410 have a wide (e.g., loose) fit tolerance relative to the fasteners 412. In these embodiments, the fasteners 412 may be tension bolts, such that the support rail 400 is coupled to the swing gear 206 via a tension joint. The slots of the swing gear 206 and the slots 410 may be threaded to receive and engage the fasteners 412. The slots 410 may be evenly spaced around the support rail 400 in order to couple the support rail 400 to the swing gear 206. In some embodiments, the slots 410 (and the fasteners 412) may be otherwise located on the support rail 400, such as to provide greater retention or resistance at a particular location on the support rail 400, or for additional clearance relative to another component.

The support rail 400 also includes slots 406 (i.e., a plurality of locating slots) configured to receive locating pins 408. The slots 406 and the pins 408 may be positioned on the support rail 400 in order to locate the support rail 400 relative to the swing gear 206, the thrust rail 218, the rollers 208, and/or another related component. In an exemplary embodiment, the swing gear 206 includes holes or slots similar to the slots 406 in order to receive the pins 408, such that the pins 408 engage both the support rail 400 and the swing gear 206, locating the support rail 400 relative to the swing gear 206. The slots of the swing gear 206 are configured to align with the slots 406 when the support rail 400 is coupled to the swing gear 206 (as shown in FIG. 5). In some embodiments, the slots 406 have a narrow (e.g., small, tight, high precision) fit tolerance relative to the pins 408 in order to limit relative movement of the pins 408 when the pins 408 are fitted within the slots 406. The pins 408 may be configured to absorb or receive a lateral load related to the thrust load received from the rollers 208.

In some embodiments, the support rail 400 may also be welded to the swing gear 206. For instance, the support rail 400 may be welded to the top face 212 of the swing gear 206 such that the support rail 400 and the swing gear 206 are in a configuration similar to that shown in FIGS. 4 and 5. In some embodiments, the support rail 400 is welded to the swing gear 206 at locations corresponding to the slots 406. For instance, the support rail 400 may be welded at the slots 406 to the top face 212 or to connect the slots 406 to corresponding slots of the swing gear 206 (e.g., in place of the pins 408). The welded portions of the support rail 400 and the swing gear 206 may be configured to receive a lateral load associated with the thrust load from the rollers 208.

Although the surfaces 212 and 420 are shown in FIG. 5 as being horizontal and vertical, respectively, in other embodiments the surfaces 212 and 420 may be intersecting and substantially perpendicular to each other but in another orientation relative to the other related components. In still other embodiments, the surfaces 212 and 420 may connect at another angle (i.e., a non-right angle, etc.). In these embodiments, the thrust rail 218 and/or the support rail 400 may be configured such that the surfaces 418 and 416 connect at a substantially similar angle, or are otherwise sized or shaped to match one or more dimensions of the surfaces 212 and 420, such that the surfaces 418 and 416 engage the surfaces 420 and 212, respectively. For instance, the surfaces 212 and 420 may connect at a first angle, and the support rail 400 may be configured such that the surface 416 intersects with the surface 418 at a second angle, wherein the second angle is substantially similar to the first angle.

The thrust rail 218 is configured to be received within a channel 422 formed within the swing gear 206, positioned between an inner surface 420 and the lower rail 216. The thrust rail 218 may be positioned within the channel 422 in order to limit movement of the thrust rail 218 relative to the swing gear 206, such as to inhibit a relative rotation of the thrust rail 218 about the top face 212. The thrust rail 218 may be sized according to one or more dimensions of the channel 422. The thrust rail 218 is also configured to engage the lower rail 216, having a flange 424 which may also inhibit a rotational movement of the thrust rail 218 relative to the swing gear 206 by engaging the lower rail 216 at a horizontal and a vertical surface. The flange 424 may also assist with proper placement or location of the thrust rail 218 and the support rail 400 relative to the swing gear 206 (e.g., such that the flange 424 interfaces with both a horizontal and vertical surface of the lower rail 216).

The thrust rail 218 may also be coupled to the swing gear 206 via fasteners 428. The fasteners 428 may be substantially similar to the fasteners 412. In the illustrated embodiment of FIGS. 4 and 5, the fasteners 428 are routed through the thrust rail 218 and the swing gear 206 such that the fasteners 428 are in a substantially vertical position. By engaging the top face 212 and the inner surface 404, the support rail 400 is configured to inhibit a radially outward movement of the thrust rail 218, and thus the support rail 400 may inhibit a bending stress on the fasteners 428 when the thrust rail 218 and the support rail 400 are coupled to the swing gear 206.

The inner surface 420 of the swing gear 206 may also be machined to engage the thrust rail 218, such as to prevent relative movement of the thrust rail 218 and/or the swing gear 206, or to locate the thrust rail 218 relative to the swing gear 206. For instance, in the illustrated embodiment of FIG. 5, the swing gear 206 includes a ledge 426 (i.e., a machined portion) configured to interface with the vertical surface 418 of the thrust rail 218. The ledge 426 may be machined or otherwise formed on the inner surface 420 in order to inhibit relative movement (e.g., rotation) of the thrust rail 218, such as to inhibit a bending moment on a top portion of the swing gear 206. The ledge 426 may also prevent or inhibit downward movement of the thrust rail 218 relative to the swing gear 206. In one embodiment, the thrust rail 218 and the ledge 426 may be sized and/or shaped according to one or more dimensions of the other, such as to maintain engagement between the two components or to assist in properly placing or locating the thrust rail 218. In other embodiments, the inner surface 420 and/or another surface of the swing gear 206 or the thrust rail 218 may be otherwise machined or formed to inhibit relative movement of the thrust rail 218 and/or the swing gear 206.

The construction and arrangement of the disclosed support rail and swing gear assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed support rail 400 and swing gear assembly 200 may be implemented into any large industrial vehicle having an upper frame (e.g., upper frame 102) configured to rotate relative to a coupled lower frame (e.g., lower frame 104) via a swing gear (e.g., swing gear 206). The support rail 400 may be implemented to receive a thrust load from an adjacent thrust rail (e.g., thrust rail 218) and retain a relative position of the thrust rail in response to the thrust load. The support rail 400 couples to the swing gear and includes the horizontal surface 416 intended to engage a horizontal surface of the swing gear. The vertical surface 404 of the support rail 400 is intended to engage a vertical surface of the thrust rail. By engaging a vertical surface of the thrust rail and a horizontal surface of the swing gear, the support rail 400 may inhibit movement of the thrust rail relative to the swing gear in more than one direction. In particular, the support rail 400 is intended to inhibit a rotational movement of the thrust rail relative to an adjacent swing gear about a top face of the swing gear, which is intended to reduce or eliminate a bending moment applied to the top face of the swing gear by the thrust rail (e.g., in response to a received thrust load). By inhibiting the relative movement of the thrust rail, the support rail 400 may also reduce a bending stress applied to fasteners of the thrust rail.

It will be apparent to those skilled in the art that various modifications and variations can be made to the disclosed support rail and swing gear assembly. Other embodiments will be apparent to those skilled in the art from consideration of the specification and practice of the disclosed support rail and swing gear assembly. It is intended that the specification and examples be considered as exemplary only, with a true scope being indicated by the following claims and their equivalents.

What is claimed is:

1. A support rail for a swing gear assembly having a thrust rail coupled to a swing gear, the support rail comprising:
   a substantially horizontal first surface configured to be coupled to the swing gear such that the first surface engages a substantially horizontal top face of the swing gear; and
   a substantially vertical second surface intersecting the substantially horizontal first surface such that the second surface is substantially perpendicular to the first surface, wherein the second surface is configured to engage a substantially vertical face of the thrust rail when the first surface is coupled to the swing gear, and wherein the first surface and the second surface are configured to inhibit a rotation of the thrust rail relative to the swing gear by engaging the top face of the swing gear and the vertical face of the thrust rail simultaneously;
   wherein the thrust rail is coupled to the swing gear via fasteners;
   wherein the support rail is positioned adjacent and substantially outside of the thrust rail relative to a central axis of the swing gear assembly.

2. The support rail of claim 1, wherein the first surface and the second surface are configured to inhibit a rotation of the thrust rail about the top face of the swing gear when the support rail is coupled to the swing gear, such that a bending moment applied to the swing gear is inhibited.

3. The support rail of claim 1, wherein the second surface is configured to receive a thrust load from the thrust rail, and wherein the first surface and the second surface are configured to substantially inhibit the rotation of the thrust rail relative to the swing gear in response to receiving the thrust load.

4. The support rail of claim 3, wherein the second surface is configured to transfer the thrust load from the thrust rail to the swing gear via the first surface when the support rail is coupled to the swing gear.

5. The support rail of claim 1, wherein the first surface includes a plurality of slots for receiving the fasteners to couple the first surface to the swing gear.

6. The support rail of claim 5, wherein the first surface includes a plurality of locating slots for receiving locating pins to locate the first surface relative to the swing gear.

7. A swing gear assembly, comprising:
   a swing gear having a substantially horizontal top face and a substantially vertical inner surface;
   a thrust rail having a substantially vertical face, wherein the thrust rail is coupled via fasteners to the swing gear such that the vertical face of the thrust rail engages a portion of the vertical inner surface of the swing gear;
   a support rail coupled to the swing gear, the support rail comprising:
     a substantially horizontal first surface engaging the top face of the swing gear; and
     a substantially vertical second surface engaging a top portion of the vertical face and intersecting the substantially horizontal first surface such that the second surface is substantially perpendicular to the first surface, wherein the first surface and the second surface are configured to inhibit a rotation of the thrust rail relative to the swing gear by engaging the top face of the swing gear and the vertical face of the thrust rail simultaneously;
   wherein the support rail is positioned adjacent and substantially outside of the thrust rail relative to a central axis of the swing gear assembly.

8. The swing gear assembly of claim 7, further comprising:
   a set of rollers interfacing with the thrust rail and configured to deliver a thrust load to the thrust rail;
   wherein the first surface and the second surface of the support rail are configured to substantially inhibit the rotation of the thrust rail relative to the swing gear in response to receiving the thrust load.

9. The swing gear assembly of claim 8, wherein the second surface is configured to transfer the thrust load from the thrust rail to the swing gear via the first surface.

10. The swing gear assembly of claim 7, wherein the first surface and the second surface are configured to inhibit a rotation of the thrust rail about the top face of the swing gear such that a bending moment applied to the swing gear by the thrust rail is inhibited.

11. The swing gear assembly of claim 7, wherein the first surface includes a first plurality of slots and the swing gear includes a second plurality of slots aligned with the first plurality of slots, and wherein the support rail is coupled to the swing gear via the fasteners routed through the first plurality of slots and the second plurality of slots.

12. The swing gear assembly of claim 11, wherein the first surface includes a plurality of locating slots for receiving locating pins to locate the first surface relative to the swing gear.

13. The swing gear assembly of claim 7, wherein the swing gear includes a channel, and wherein the thrust rail is received within the channel such that the vertical face interfaces with both the inner surface of the swing gear and the second surface of the support rail.

14. The swing gear assembly of claim 7, wherein the inner surface of the swing gear includes a machined portion, and wherein the thrust rail is configured to engage with the machined portion in order to inhibit the rotation of the thrust rail relative to the swing gear.

15. The swing gear assembly of claim 7, wherein the top face and the inner surface connect to form a first angle, wherein the first surface and the vertical face connect to form a second angle, and wherein the second angle is substantially similar to the first angle.

16. A method of enhancing support for a swing gear assembly, the method comprising:
- coupling a thrust rail to the swing gear via fasteners;
- boring a plurality of slots in a substantially horizontal top face of a swing gear;
- placing a support rail proximate to the thrust rail and the plurality of slots, wherein the support rail is positioned adjacent and substantially outside of the thrust rail relative to a central axis of the swing gear assembly wherein the thrust rail includes a substantially vertical face; and
- using the plurality of slots, coupling the support rail to the swing gear such that a substantially horizontal first surface of the support rail engages the top face of the swing gear and a substantially vertical second surface of the swing gear engages the vertical face of the thrust rail, and wherein the first surface and the second surface are configured to inhibit a rotation of the thrust rail relative to the swing gear by engaging the top face and the vertical face simultaneously.

17. The method of claim 16, wherein the first surface and the second surface are configured to inhibit a rotation of the thrust rail about the top face of the swing gear, such that a bending moment applied to the swing gear is inhibited.

18. The method of claim 16, wherein the support rail is placed such that the second surface is configured to receive a thrust load from the thrust rail, and wherein the second surface is configured to transfer the thrust load from the thrust rail to the swing gear via the first surface.

19. The method of claim 18, further comprising:
- boring a second plurality of slots in the swing gear;
- locating the support rail relative to the swing gear by routing pins through the support rail and the swing gear via the second plurality of slots, wherein the pins are configured to receive at least a portion of the thrust load.

20. The method of claim 16, further comprising:
- inhibiting movement of the support rail and the thrust rail relative to the swing gear by welding the support rail to the swing gear.

* * * * *

UNITED STATES PATENT AND TRADEMARK OFFICE
CERTIFICATE OF CORRECTION

PATENT NO. : 9,506,219 B2  
APPLICATION NO. : 14/325973  
DATED : November 29, 2016  
INVENTOR(S) : Bienfang et al.

Page 1 of 1

It is certified that error appears in the above-identified patent and that said Letters Patent is hereby corrected as shown below:

On the Title Page

Column 2, Item (74) (Attorney, Agent, or Firm), Line 1, delete "Foley & Lardner" and insert -- Foley & Lardner LLP --.

Signed and Sealed this
Eighteenth Day of April, 2017

Michelle K. Lee
*Director of the United States Patent and Trademark Office*